United States Patent
Peterson et al.

[11] Patent Number: 6,028,511
[45] Date of Patent: Feb. 22, 2000

[54] LIGHT ACTIVATED BACK-UP ALARM

[75] Inventors: Edwin R. Peterson; Edwin Lee Wheeler; James E. Stewart, all of Boise, Id.

[73] Assignee: Preco New Products Corp., Boise, Id.

[21] Appl. No.: 09/153,351

[22] Filed: Sep. 15, 1998

[51] Int. Cl.⁷ ..................................................... B60Q 1/26
[52] U.S. Cl. ........................ 340/463; 340/468; 340/474; 307/10.8
[58] Field of Search .................... 340/460, 461, 340/438, 463, 468, 472, 458, 459, 474; 362/540, 542; 307/10.8

[56] References Cited

U.S. PATENT DOCUMENTS

| | | | |
|---|---|---|---|
| 3,541,504 | 11/1970 | Bush | 340/458 |
| 3,688,297 | 8/1972 | Barnum | 340/458 |
| 3,818,438 | 6/1974 | Stacha, Jr. | 340/463 |
| 4,224,551 | 9/1980 | Liebegott | 362/61 |
| 4,449,602 | 5/1984 | Dittmann, Jr. | 180/215 |
| 4,603,317 | 7/1986 | Gailbreath et al. | 340/463 |
| 4,803,488 | 2/1989 | Dombrowski | 340/904 |
| 4,885,567 | 12/1989 | Katz | 340/463 |
| 4,903,007 | 2/1990 | Gottlieb | 340/474 |
| 4,994,800 | 2/1991 | Milliken | 340/901 |
| 5,132,665 | 7/1992 | Hutchisson et al. | 340/463 |
| 5,223,814 | 6/1993 | Suman | 340/461 |
| 5,272,464 | 12/1993 | Jorgensen | 340/460 |
| 5,276,594 | 1/1994 | Burkett et al. | 362/83.3 |
| 5,440,288 | 8/1995 | Gottlieb et al. | 340/463 |
| 5,510,763 | 4/1996 | Deckard et al. | 340/431 |

*Primary Examiner*—Jeffery A. Hofsass
*Assistant Examiner*—Van T. Trieu
*Attorney, Agent, or Firm*—Frank J. Dykas; Robert L. Shaver

[57] ABSTRACT

A light activated back-up alarm is provided for use with a vehicle having at least one white back-up light. It includes an optical sensor for attachment to the outside lens of the vehicle back-up light and an alarm circuit and battery encased within an alarm housing. The optical sensor is adhesively attached to the light and the alarm housing adhesively attached to some other portion of the vehicle.

23 Claims, 8 Drawing Sheets

LIGHT ACTIVATED BACK-UP ALARM

BACKGROUND OF THE INVENTION

1. Field of the Invention

This invention relates to vehicle back-up alarms, and more particularly to a vehicle back-up alarm that is activated by a photo sensor detecting when a vehicle back-up light turns on.

2. Background Information

Vehicle back-up alarms have been known and used in the prior art for a number of years. They were originally installed on construction and industrial equipment used in noisy environments, such as construction sites or manufacturing facilities where there is a lot of activity and where workers may not hear the equipment being backed up until it is too late to prevent injury.

The original designs, still in use today, are back-up alarms which are mounted, in one fashion or another and are activated by movement of a vehicle axle. It was and continues to be a lot of work to install these devices, and it generally requires a skilled mechanic to do so.

Eventually usage expanded to delivery vehicles, but again they are typically axle-mounted devices which require skilled mechanics to install them. More recently back-up alarm designs have been developed which utilize the vehicle electrical system, and in particular, the lines which power the back-up lights of the vehicle. These designs generally include replacing or modifying the light socket for one of the back-up lights of the vehicle, such that when the light is activated by the driver placing the vehicle in a reverse gear, the alarm begins to sound. Again, installation of these types of devices requires the services of a mechanic, or someone skilled in identifying the wiring systems and capable of changing a light socket on a vehicle.

Vehicle back-up alarms save lives and prevent injuries. It is desirable that their usage be further expanded to include installation on all sorts of vehicles, including passenger vehicles. For example, many fast food restaurants feature delivery services. Typically these delivery services are accomplished by part-time employees who use their own personal vehicles for which their mileage is reimbursed by the restaurant. There are other situations where back-up alarms would be highly useful, particularly with passenger vans, recreational vehicles and automobiles where the drivers cannot easily see behind them as they are backing up along driveways, alleys or even in parking lots. It is tragic, and unfortunately common, for small children who are not paying attention to be run over and either injured or killed by a family member backing a vehicle out of a garage and down a driveway.

Unfortunately, the prior art designs for back-up alarms make them difficult for ordinary people to purchase and install. Since installation requires the services of a skilled mechanic, they are not readily available to the general public through department or discount stores. To purchase a prior art back-up alarm, and have it installed, one usually must first go to a specialty store, such as an auto parts store to purchase the back-up alarm, and then to a mechanic to have it installed. If one were to install a back-up alarm in a personal vehicle, and then decide to sell the vehicle and purchase a new one, the seller of the vehicle must first go back to the mechanic to have the back-up alarm removed from the old car and again back to the mechanic to have it re-installed in the new vehicle.

What is needed is a back-up alarm that can be installed on a vehicle without the aid of a mechanic, and without mechanically or electrically altering the vehicle configuration. What is needed is a back-up alarm whose installation is so simple that virtually anyone in the general public who qualifies to hold a driver's license can install and/or remove the back-up alarm from any vehicle that has back-up lights.

Accordingly, it is an object of the present invention to provide a vehicle back-up alarm system which optically senses when the back-up lights are illuminated to activate a loud speaker or transducer to provide a warning signal external of the vehicle, to persons located outside, particularly rearward, of the vehicle. It is another object of this invention to provide a vehicle back-up alarm that can be installed without interconnection to, or alteration of, the vehicle electrical or mechanical systems. It is another object of the present invention to provide for a vehicle back-up alarm that can be installed in minutes without the use of tools and likewise removed in minutes without the need for using hand tools. It is another object to provide a vehicle back-up alarm which can be installed by the vast majority of the general public without the aid of a mechanic.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These objects are achieved in the use of a battery operated back-up alarm circuit connected to an optical sensing means, such as a photo transistor, solar cell, photo resistor or other device which is reactive to the presence of light.

The photo transistor is encased within an optical sensor case which is adapted to be adhesively attached to the exterior surface of the lens of a vehicle back-up light, using adhesive tape. An alarm housing is provided which encases the back-up alarm circuit, a transducer or loud speaker, and the battery. In one embodiment, the alarm case is made of somewhat flexible material so that it can be bent to conform to the curved surface of a vehicle, such as a rear bumper. It is attached to the vehicle by means of an adhesive, and interconnected to the optical sensor by wires.

In a second embodiment the optical sensor, back-up alarm circuit, and battery are all held within a unitary alarm housing which is adapted to be at least adhesively attached to the exterior surface of the lens of a vehicle back-up light.

In one circuit embodiment, a photo transistor, being used as an optical sensor, acts as a conductive switch between a 9-volt battery and a voltage regulator. The voltage regulator, in turn, powers a flasher, which cycles at the rate of 2 Hz from high to low, and when going high, turns on a second transistor which switches on the transducer.

In the second embodiment, similar arrangements are made for the photo transistor to serve as an optical sensor to switch on and supply power to a voltage regulator. However, in the second embodiment, the voltage regulator powers a digital device, such as an EEPROM which in turn controls an output transistor and loud speaker, such that the loud speaker broadcasts either an audible message or some sort of melodic sound.

In a third circuit embodiment a second optical sensor is added to the circuit and configured to sense only reflected light and not the direct illumination light of the illuminated backup light. In the situation where both optical sensors detect reflected light, but not direct illumination light of the illuminated backup light, the second optical sensor turns on to reduce the voltage applied to the voltage regulator to a level below that required to turn it on, thus precluding operation of the oscillator upon detection a large amount of reflected light without the presence of the direct light of the illuminated backup light.

DESCRIPTION OF THE PREFERRED EMBODIMENTS

Figure 1:
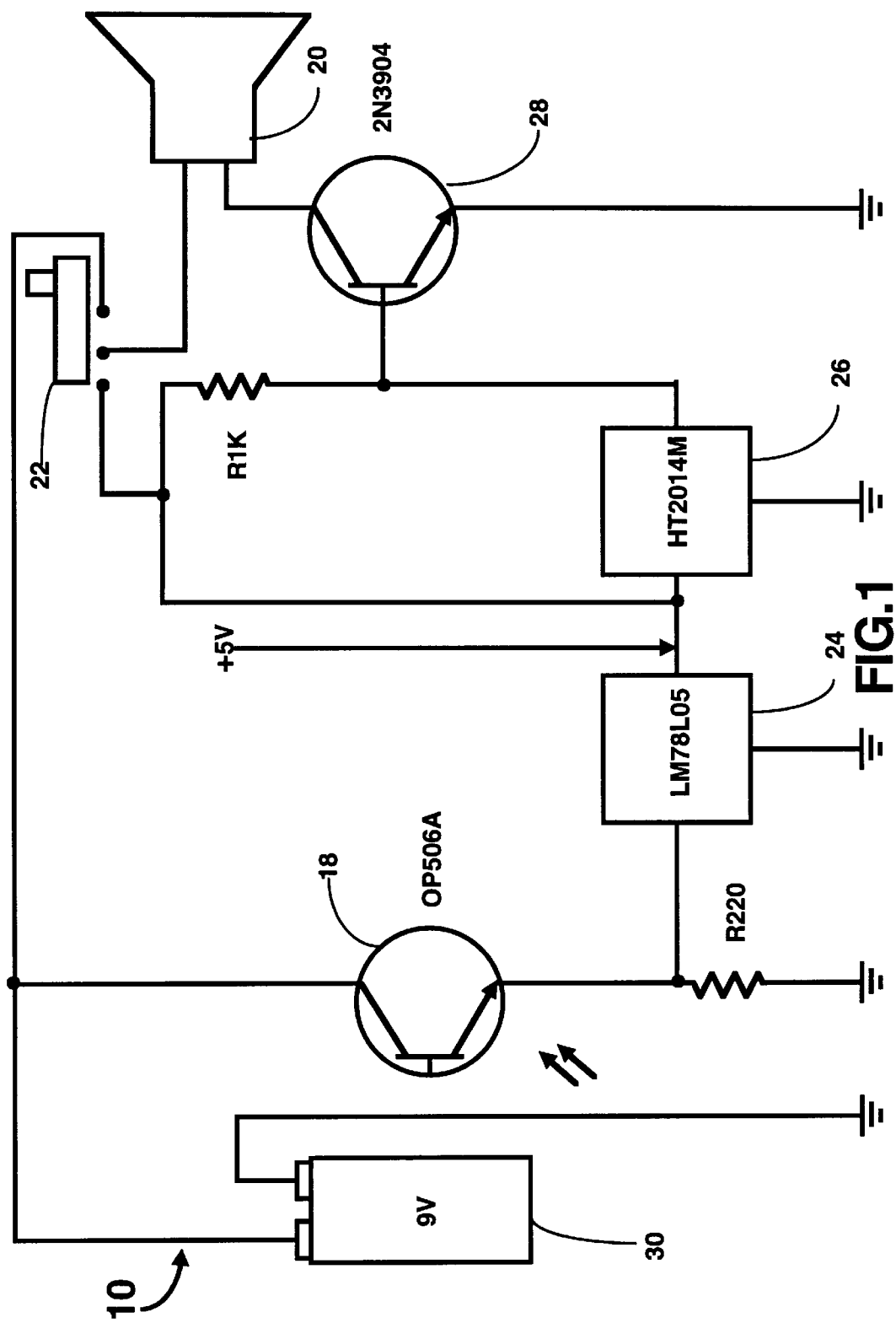
FIG. 1 is a circuit schematic for a first embodiment of the back-up alarm.

FIG. 1 discloses a first circuit embodiment for back-up alarm 10. This is powered by 9-volt battery 30, which is interconnected to an optical sensing means, which in this first preferred embodiment is photo transistor 18, which in this embodiment is an Optek OP 506A, which is in series with resistor R220, and functions as an optical sensor and a photo conductive switch. Photo transistor 18 is selected in the preferred embodiment because it is most sensitive to near infrared light in the frequency range of around 935 nanometers, which is near the peak of the normalized output of both standard tungsten incandescent white light lamps and halogen white light lamps.

There are other types of optical sensing means, besides photo transistors, which will also work. These include photo resistors, solar cells, as well as a variety of other devices which are reactive to the presence of light and known to those skilled in the art.

Figure 4:
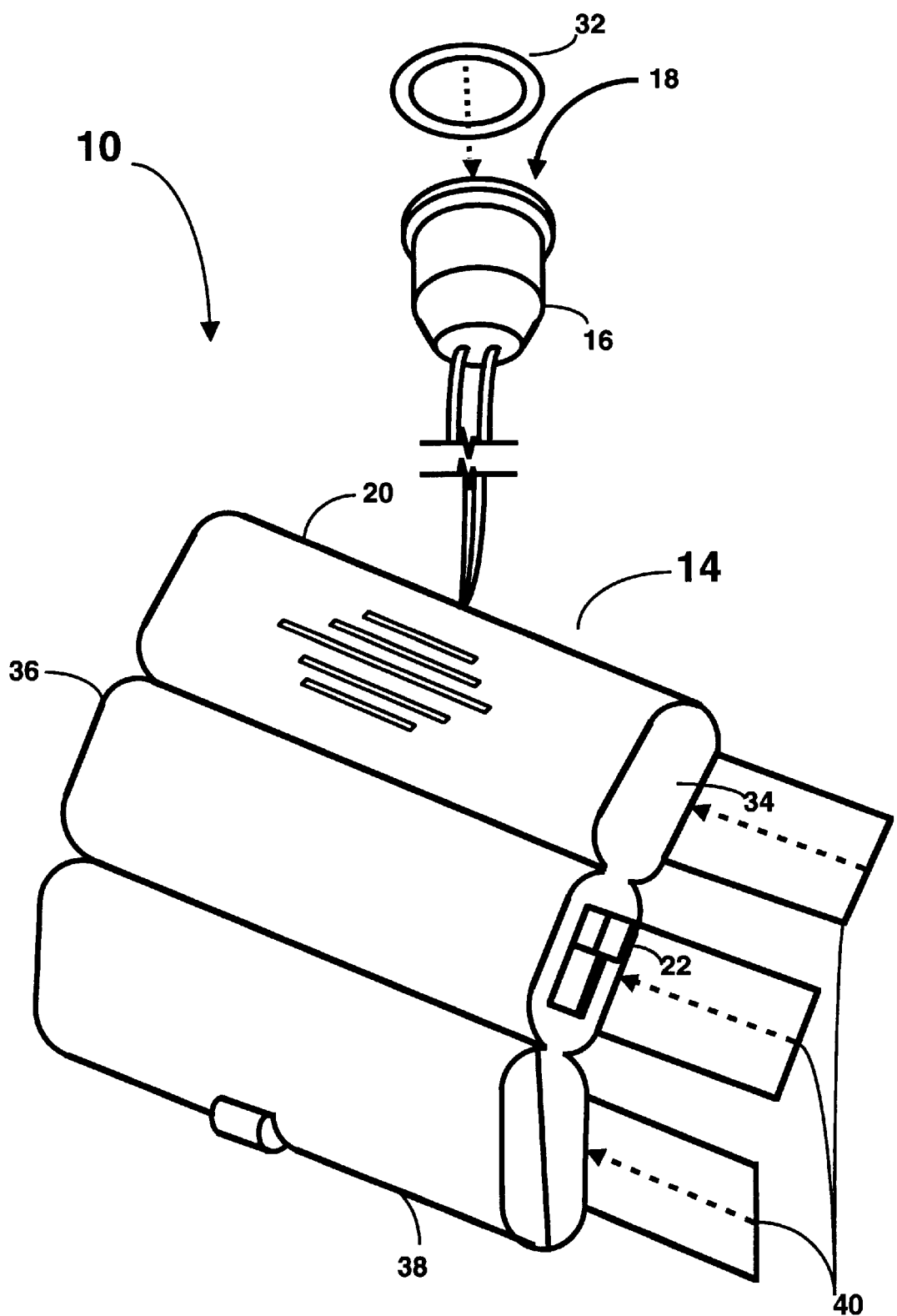
FIG. 4 is a perspective representational view of a first embodiment of the back-up alarm case and photo detector assembly.
Figure 5:
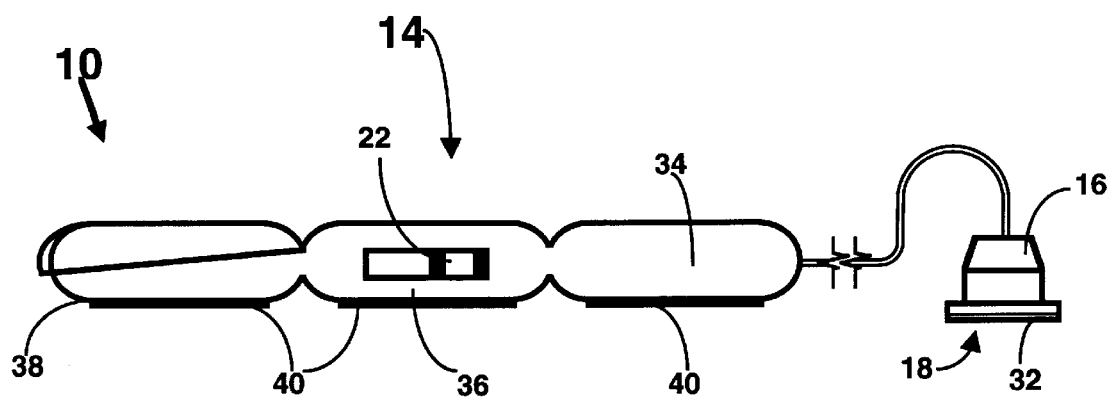
FIG. 5 is a side view of the photo detector assembly shown in FIG. 4.
Figure 6:
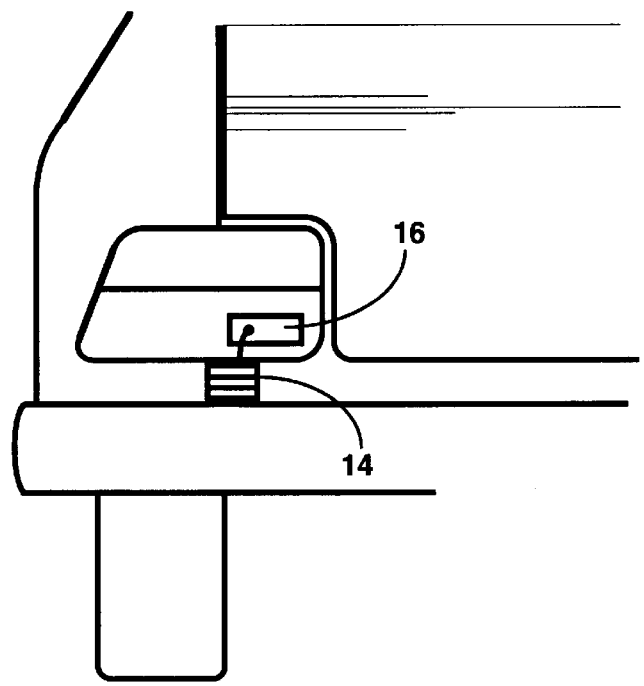
FIG. 6 is a perspective representational view of the rear of an automobile having the back-up alarm of FIG. 3 attached to it.

Photo transistor 18 is encased, as shown in FIGS. 4 and 5 within optical sensor case 16, which is adapted to be adhesively attached to the exterior surface of a lens of a vehicle back-up light by means of adhesive tape 32, as shown in FIGS. 5 and 6. While in the preferred embodiment optical sensor case 16 is attached to the exterior surface of a back-up light lens, it is not necessary that it is so attached in order to practice the invention. It can also be located within the back-up light, or be attached at some spaced apart distance from the lens. However placing optical sensor case 16 within the back-up light, or securing it at some spaced apart distance from the lens, may defeat one of the primary objects and advantages of the present invention, namely having the installation of back-up alarm 10 be so easy to accomplish that virtually anyone can do it.

Referring again to FIG. 1, once photo transistor 18 switches on, most of the voltage from battery 30 is applied to voltage regulator 24, which in this first preferred embodiment is voltage regulator LM78L05, and has a regulated output of 5 volts.

With photo transistor 18 switched on, voltage regulator 24 delivers a regulated 5-volt output to oscillator 26, which in this first preferred embodiment is flasher HT2014M, which cycles high and low at a frequency of 2 Hz. When the flasher is active, it goes low, to ground, and when it goes high, it turns on transistor 28 which provides a path to ground for loudspeaker 20. In the preferred embodiment, loudspeaker 20 is a piezo electric speaker, with or without a speaker cone. Power is supplied to loudspeaker 20 through high-low volume switch 22. In the high position loudspeaker 20 is powered at the full voltage from battery 30, and in the low position with the 5-volt regulated power from voltage regulator 24. In this first preferred embodiment, loudspeaker 20 will emit an audible beeping sound in the audible range, preferably in the 200 Hz to 800 Hz range each time it beeps, to persons located outside of the vehicle.

Figure 2:
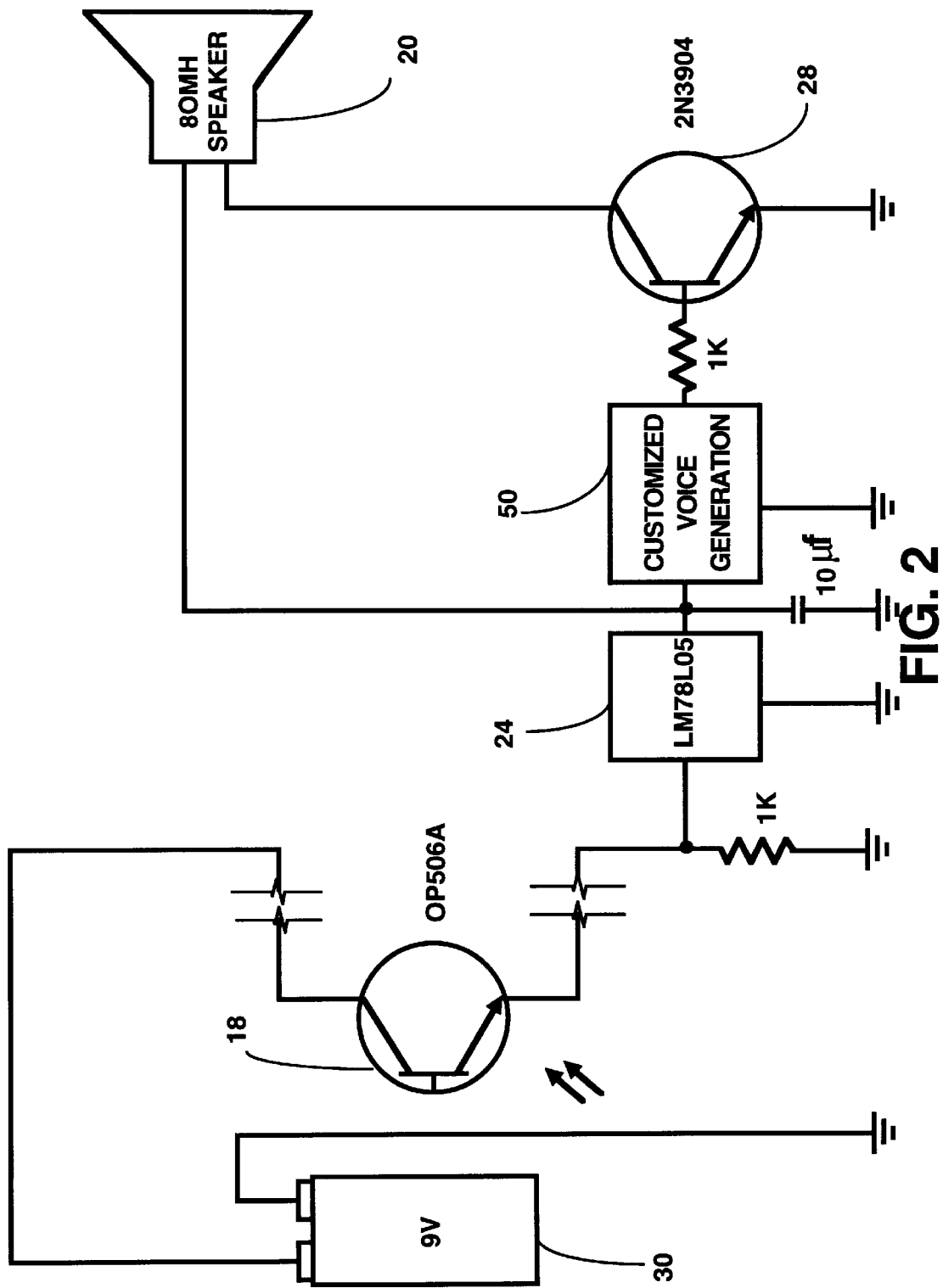
FIG. 2 is a circuit schematic for a second embodiment of the back-up alarm.

A second embodiment for the circuit design is shown in FIG. 2. In FIG. 2, photo transistor 18 functions a photo conductive switch connecting battery 30 to voltage regulator 24 in the same manner as shown in the circuit of FIG. 1. However in this circuit, voice or melody generator 50 is used as the control signal for transistor 28 thus enabling loudspeaker 20 to broadcast a simulated voice message such as "backing up, backing up" or some sort of melodic signal, such as a bird chirping or whatever. In the circuit of FIG. 2, voice or melody generator 50 is a digital device such as an EPROM.

It should be apparent to those skilled in the art that there are a host of other circuit designs which can be used in conjunction with an optical sensor to turn on an audible alarm. Some of these include Schmidtt triggers and various other types of oscillators.

Another feature that can easily be added to the circuit design is an ambient noise adjustment circuit module, wherein ambient noise is monitored, and the output to the loudspeaker is adjusted, either up or down, according to the amount of ambient noise. Such circuits are already well known to those skilled in the art.

Figure 3:
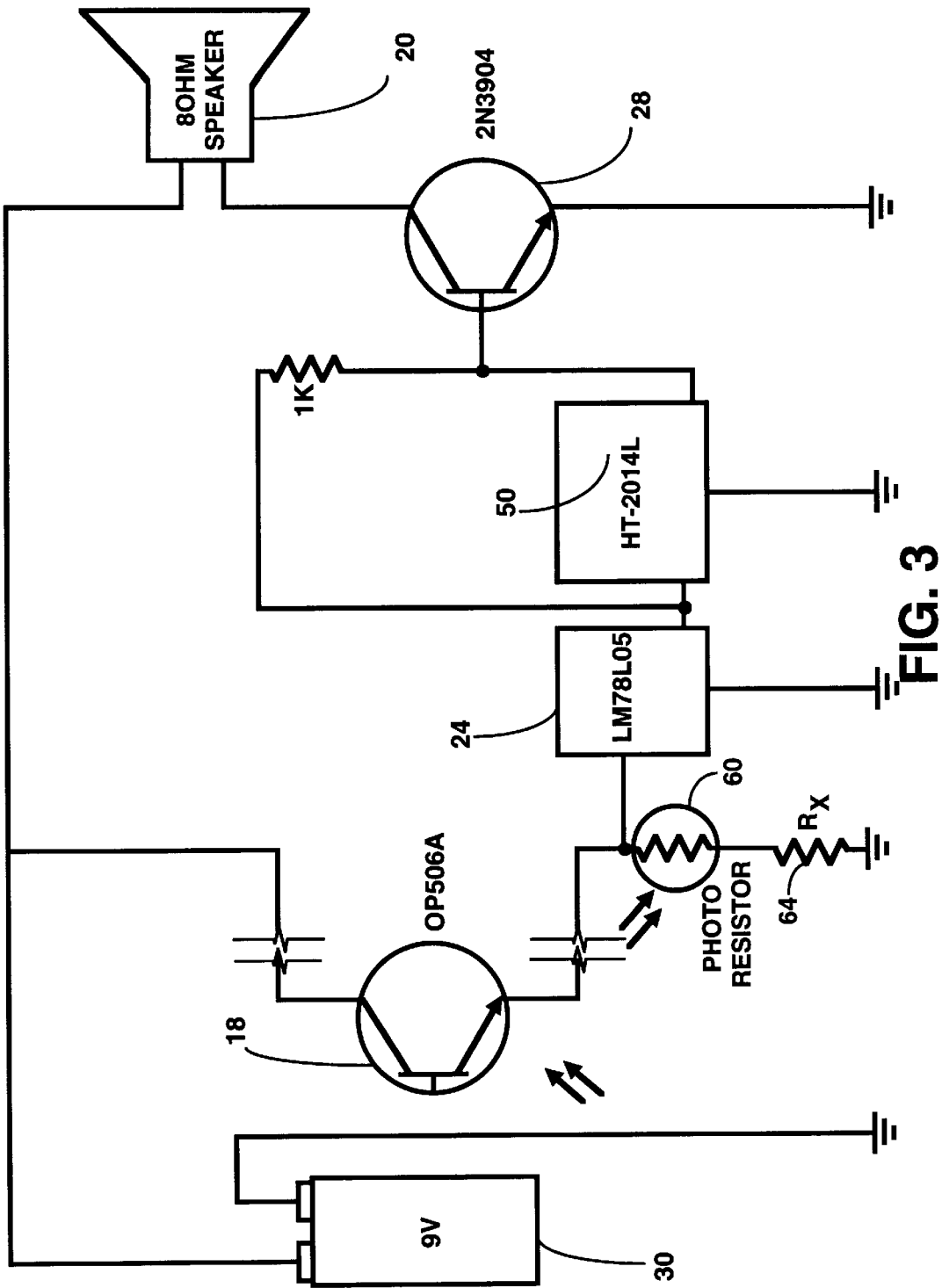
FIG. 3 is a circuit schematic for a third embodiment of the back-up alarm.

There is shown in FIGS. 4 and 5 a first embodiment of the alarm housing design which can be used to enclose either of the circuits shown in FIGS. 1 or 2, or any other similar circuit. Alarm housing 14 is, in this preferred embodiment, formed of three cavities which are interconnected by what can be described as resilient hinges, so as to provide some flexibility to the alarm housing so that it can bent in a curve to conform to a curved surface of the vehicle, such as the top of the rear bumper, as is shown in FIGS. 4 and 6. First cavity 34 encloses loudspeaker 20. The circuit of either FIGS. 1 or 2, or for that matter, any other suitable circuit, is enclosed within second cavity 36, and battery 30 is encased within third cavity 38. FIG. 3 is shown with the high-low loudspeaker switch 22 of the circuit described in FIG. 1. Third cavity 38, which encases battery 30 is provided with a latch, and is openable so as to provide for battery replacement. As shown in FIGS. 4 and 5 Photo transistor 18 is housed within optical sensor housing 16, and connected to the circuit contained within alarm housing 14 by means of standard wires.

Optionally, an on/off switch could be incorporated within the control circuit. However, doing so presents the problem that the back-up alarm must be turned on for it to work. If a person were to turn it off, for whatever reason, then the next driver of the vehicle would have to remember to turn it back on. For this reason, an on/off switch has not been incorporated into the preferred embodiments.

As shown in FIGS. 4 and 5, alarm housing 14 can be attached using adhesive tape 40 to the bumper and optical sensor housing 16 is attached, also by adhesive tape 32, to the lens of the back-up light of the vehicle. However there are other means of attaching alarm housing 14 to a vehicle, which include the use of brackets and standard fasteners. Such attachment will be adjacent to the back-up light. The reason adhesive tape is used in the preferred embodiment is, as previously stated, ease and simplicity of installation.

Figure 7:
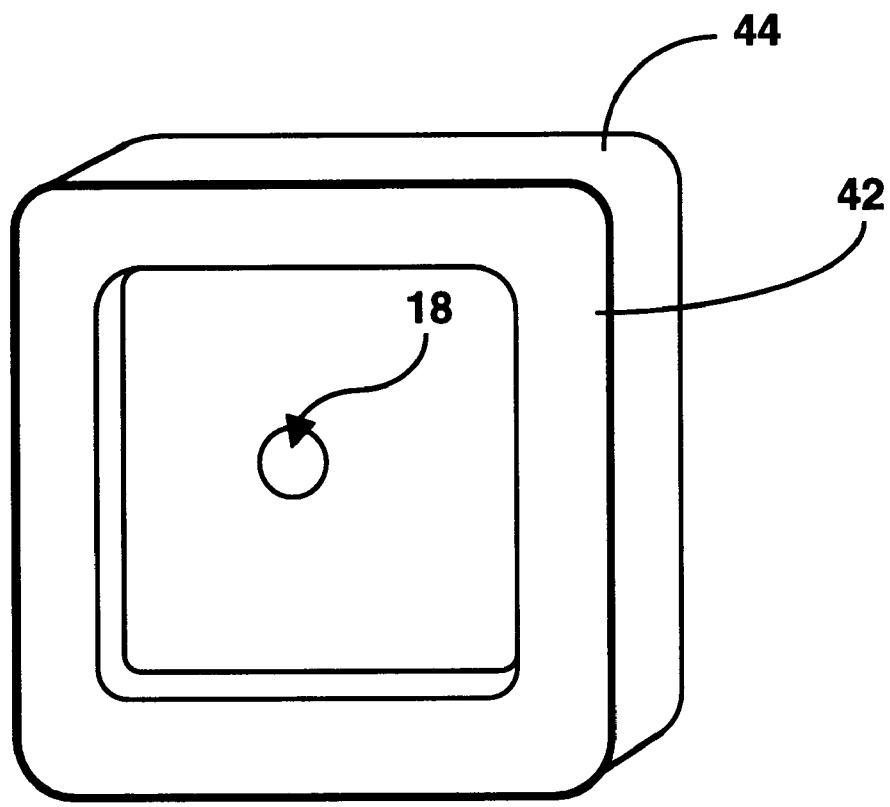
FIG. 7 is a perspective representational view of a second embodiment of a back-up alarm case.
Figure 8:
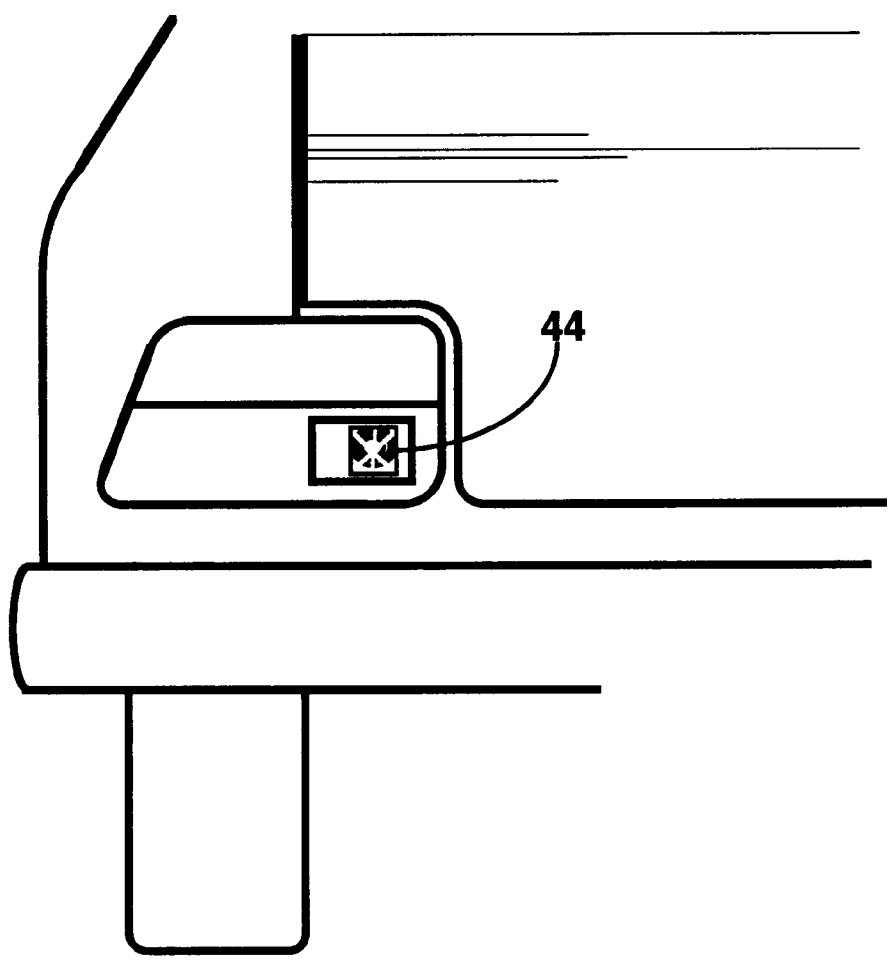
FIG. 8 is a representational view of the rear of a vehicle having the back-up alarm of FIG. 6 attached to it.

The back-up alarm of the present invention is not a particularly large or bulky product. It can be designed and encased within a unitary housing wherein length, width and depth dimensions are measured in the range of a few centimeters. As a result, it can be made small enough so as to be provided with a unitary housing 44, such as that shown in FIGS. 7 and 8. This type of design would be simpler to install, since the user simply exposes adhesive tape 42 and sticks the unitary housing directly on to the lens of the vehicle back-up light. The optical sensor, namely photo transistor 18, is thus shielded from outside sources of light, other than light from the illuminated back-up light and some light from an outside source reflected through the lens of the back-up light, and thus still functions as a optical switch to turn on the back-up alarm. This second back-up alarm unitary housing embodiment will work well on vehicles which are provided with back-up lights having large enough lenses such that even with a portion of the lens covered by case 44 sufficient light still remains to provide adequate illumination for the driver to see when moving the vehicle backward.

In practice, it has been found that if photo transistor 18 is pointed directly at the sun, it will become photo conductive, however, in the vast majority of situations, reflected sunlight or light from vehicle headlights will not be of sufficient strength to switch photo transistor 18 on. This is particularly true for vehicles having back-up light lenses which are of the diffusing light type, which are found on the vast majority of passenger vehicles and light trucks manufactured today. If the vehicle back-up light is designed to feature an absolutely clear, non-diffusing lens, then it is possible, under certain circumstances, that sufficient reflected sunlight will partially switch on photo transistor 18 at least enough to provide sufficient voltage to voltage regulator 24 to turn it on and thus activate backup alarm 10. Thus for vehicles having clear, non-diffusing lenses for back-up lights, it is possible that first and second circuit embodiments as shown in FIGS. 1 and 2 will not be suitable designs for use.

Figure 9:
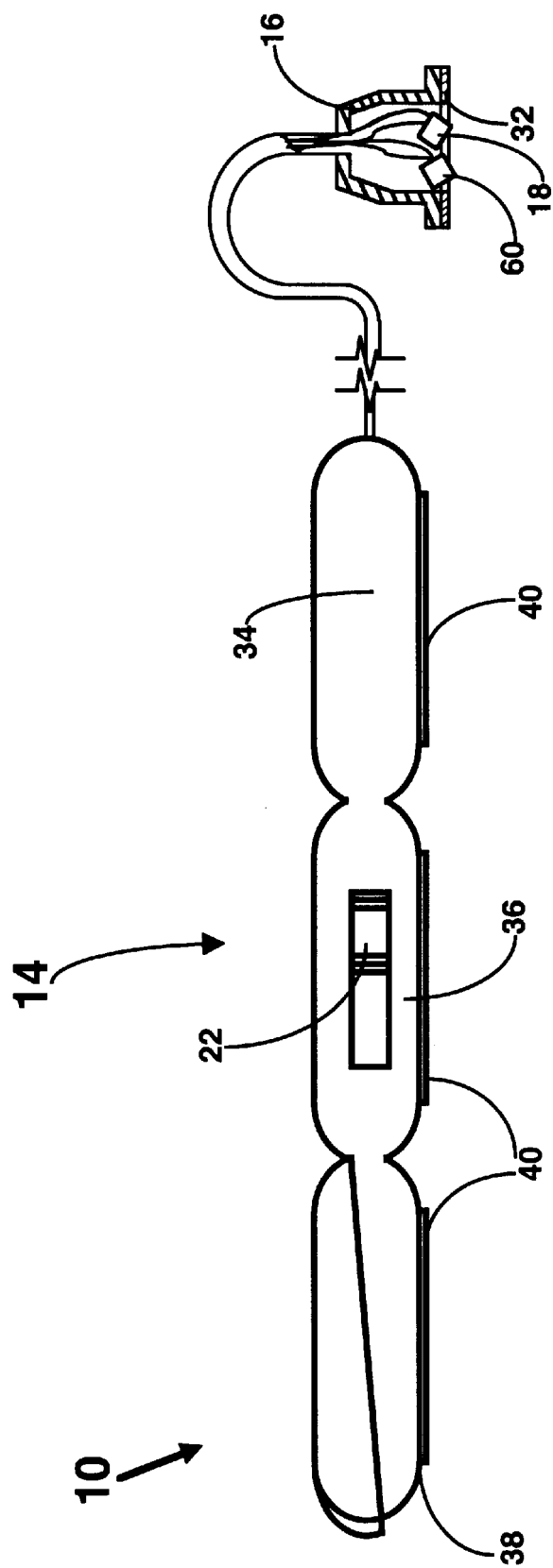
FIG. 9 is a side view of the photo detector assembly shown in FIG. 4 showing a sectional side view of a optical sensor housing containing the two optical sensors of the circuit shown in FIG. 3.

Accordingly there is shown in FIGS. 3 and 9 a third circuit embodiment. In this embodiment photo resister 60 and resister 64 $R_x$ are placed in series with photo transistor 18. As shown in FIG. 9, photo resister 60 is also housed within optical sensor housing 62 alongside photo transistor 18, however it is angled off so as to sense reflected light as opposed to direct light from the actual light bulb of the backup light. In this embodiment optical sensor housing 62 is positioned on the lens of the backup light so that photo transistor 18 is directly aligned with the bulb within the backup light and thus senses both reflected light and direct illumination light from the light bulb of the backup light. Since photo resistor 60 is angled off, it will not sense direct bulb light, but rather, reflected light. Therefore, if, in case there is sufficient reflected light, for example from sunlight, to partially turn on photo transistor 18, the same reflected light will also turn on photo resistor 60 which will provide a path to ground through resistor 64 for the output of photo transistor 18, which will reduce the voltage applied to voltage regulator 24 to below the five volts necessary to turn on voltage regulator 24, thus preventing reflected light from inadvertently turning on backup alarm 10.

When the backup light is activated photo transistor 18 turns fully on, as does photo resistor 60, however photo resistor 60 will have a residual resistance, and that residual resistance, together with the resistance of resistor 64, is sufficient to serve as a voltage divider to hold the output voltage from photo transistor 18 at a high enough level to turn on voltage regulator 24, thus turning on the backup alarm. The actual value for resistor 64 is dependent upon the specifications and resistance values for the photo resistor 60 that is selected for use in the circuit of FIG. 3, and is a value that can easily be determined by one who is skilled in the art. And, it may be that the residual resistance of the selected photo resistor 60 may, in itself, be sufficient to hold the output voltage from photo transistor 18 high enough when photo transistor 18 is fully turned on by illumination of the backup light to turn on voltage regulator 24 such that resistor 64 is not necessary to operation of the circuit. The remainder of the circuit shown in FIG. 3 is the same as that as shown and described in FIG. 2. While the circuit of FIG. 3 is not as energy efficient it will reduce spurious and inadvertent activation of the backup alarm.

While there is shown and described the present preferred embodiment of the invention, it is to be distinctly understood that this invention is not limited thereto but may be variously embodied to practice within the scope of the following claims.

I claim:

1. A light activated backup alarm, for use with a vehicle having at least one backup light having an outer lens, which comprises:

optical sensing means for sensing when said vehicle backup light is illuminated;

an electrical power source;

means for emitting an audible signal when said optical sensing means senses that said vehicle backup light is illuminated, electrically connected to both said power source and said optical sensing means; and an alarm housing for encasing said electrical power source and said means for emitting an audible signal, said alarm housing attached to said vehicle adjacent to said backup light.

2. The light activated backup alarm of claim 1 wherein said optical sensing means further comprises a photo transistor.

3. The light activated backup alarm of claim 1 wherein said optical sensing means is adapted for attachment to said backup light.

4. The light activated backup alarm of claim 1 wherein said optical sensing means is adapted for attachment to said outer lens of said backup light.

5. The light activated backup alarm of claim 1 wherein said alarm housing is adapted for adhesive attachment to said vehicle.

6. The light activated backup alarm of claim 1 wherein said alarm housing also houses said optical sensing means.

7. The light activated backup alarm of claim 6 wherein said alarm housing is adapted for adhesive attachment to said outer lens of said backup light.

8. The light activated backup alarm of claim 1 wherein said electrical power source further comprises at least one battery.

9. The light activated backup alarm of claim 1 wherein said electrical power source further comprises means for interconnecting said means for emitting an audible signal and said optical sensing means to the electrical system of said vehicle.

10. The light activated backup alarm of claim 1 wherein said optical sensing means further comprises a photoresistor.

11. The light activated backup alarm of claim 1 wherein said optical sensing means further comprises a photocell.

12. The light activated backup alarm of claim 1 wherein said means for emitting an audible signal further comprises:

an oscillator, electrically connected to said optical sensing means, for producing an oscillating output signal when said optical sensing means senses that said vehicle backup light is illuminated; and a transducer electrically connected to said oscillator for producing an audible signal responsive to said oscillator output signal.

13. The light activated backup alarm of claim 12 wherein said transducer further comprises a piezoelectric transducer.

14. The light activated backup alarm of claim 1 wherein said audible signal is a periodic beeping sound.

15. The light activated backup alarm of claim 1 wherein said audible signal is a periodic chirping sound.

16. The light activated backup alarm of claim 1 wherein said audible signal is a periodic chiming sound.

17. The light activated backup alarm of claim 1 wherein said audible signal is a melodic tune.

18. The light activated backup alarm of claim 1 wherein said audible signal is a spoken message.

19. The light activated backup alarm of claim 1 which further comprises:

means for sensing the volume of ambient noise surrounding said vehicle; and means for adjusting the volume of said audible signal relative and responsive to said volume of ambient noise.

20. The light activated backup alarm of claim 1 wherein said means for emitting an audible signal is a voltage regulator operatively connected to an oscillator which is operatively connected to a transducer capable of emitting an audible signal responsive to the output of said oscillator, and said power source is a battery, and said optical sensing means electrically interconnects said battery and said voltage regulator and is operable to apply power from said battery to said voltage regulator when said optical sensor senses the illumination of said backup light.

21. A light activated backup alarm, for use with a vehicle having at least one operable backup light:

first optical sensing means for sensing both direct illumination from said operable backup light and reflected light;

second optical sensing means for sensing only reflected light;

an electrical power source;

means for emitting an audible signal when said first optical sensing means senses direct illumination from said backup light and for precluding the emission of said audible signal when both said first and second optical sensing means sense the presence of reflected light, operatively connected to said first and second optical sensing means.

22. A light activated backup alarm, for use with a vehicle having at least one backup light having an outer lens, which comprises:

optical sensing means for sensing when said vehicle backup light is illuminated;

an electrical power source; and means for emitting an audible signal external to said vehicle when said optical sensing means senses that said vehicle backup light is illuminated, electrically connected to both said power source and said optical sensing means, said means located adjacent to said backup light, and attached to said vehicle.

23. A light activated backup alarm, for use with a vehicle having at least one backup light having an outer lens, which comprises:

optical sensing means for sensing when said vehicle backup light is illuminated;

an electrical power source;

means for emitting an audible signal when said optical sensing means senses that said vehicle backup light is illuminated, electrically connected to both said power source and said optical sensing means; and an alarm housing for encasing said electrical power source, said means for emitting an audible signal, and said optical sensing means, said alarm housing is adapted for adhesive attachment to said outer lens of said backup light.

\* \* \* \* \*